United States Patent
Das et al.

(10) Patent No.: US 8,194,829 B1
(45) Date of Patent: Jun. 5, 2012

(54) LEAVING A MESSAGE FOR A PARTY WHILE ON AN ACTIVE REAL-TIME COMMUNICATION

(75) Inventors: Sreerupa Das, Arvada, CO (US); ShengXiang Gui, Broomfield, CO (US); Ashis Maity, Arvada, CO (US); Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 1490 days.

(21) Appl. No.: 11/715,139

(22) Filed: Mar. 7, 2007

(51) Int. Cl.
*H04M 1/64* (2006.01)
*H04M 11/00* (2006.01)
*H04L 12/58* (2006.01)

(52) U.S. Cl. ............... 379/88.25; 379/68; 379/215.01; 379/393; 379/88.18; 379/265; 379/87; 379/77; 379/163; 379/204.01; 379/88.14; 379/88.04; 379/88.12; 379/88.2; 379/88.16; 379/207.04; 379/88.21; 455/412.1; 455/414.4; 455/413; 455/567

(58) Field of Classification Search ............... 455/412.1, 455/414.1, 413, 567; 379/68, 88.23, 215.01, 379/393, 88.18, 265, 215, 87, 70, 74, 77, 379/1, 62, 163, 204, 88.26, 88.22, 88.14, 379/67.1, 88.01, 88.04, 88.12, 88.13, 88.16, 379/88.19, 88.2, 88.21, 207.04, 204.01
See application file for complete search history.

(56) References Cited

U.S. PATENT DOCUMENTS

| | | | |
|---|---|---|---|
| 5,930,339 A | 7/1999 | Nepustil | |
| 5,982,877 A * | 11/1999 | Nunokawa et al. | 379/357.02 |
| 6,169,786 B1 * | 1/2001 | Dunn et al. | 379/88.25 |
| 6,222,909 B1 * | 4/2001 | Qua et al. | 379/88.22 |
| 6,269,151 B1 * | 7/2001 | Hanson | 379/69 |
| 6,584,178 B2 * | 6/2003 | Crockett et al. | 379/67.1 |
| 6,704,565 B1 * | 3/2004 | Parsons et al. | 455/414.1 |
| 6,941,131 B2 * | 9/2005 | Roderique | 455/417 |
| 7,088,991 B2 * | 8/2006 | Nakajima | 455/412.1 |
| 7,133,503 B2 * | 11/2006 | Revisky et al. | 379/88.12 |
| 7,254,221 B2 * | 8/2007 | Koch | 379/88.21 |
| 7,277,529 B1 * | 10/2007 | Wuthnow et al. | 379/88.14 |
| 7,881,454 B2 * | 2/2011 | Tuchman et al. | 379/266.01 |
| 8,019,056 B2 * | 9/2011 | Worley et al. | 379/88.18 |
| 2002/0039407 A1 * | 4/2002 | O'Donovan et al. | 379/67.1 |
| 2002/0067806 A1 * | 6/2002 | Rodriguez et al. | 379/88.12 |
| 2002/0115429 A1 * | 8/2002 | Deluca et al. | 455/413 |
| 2002/0115478 A1 * | 8/2002 | Fujisawa et al. | 455/567 |
| 2003/0003901 A1 * | 1/2003 | Kuroiwa | 455/419 |
| 2004/0141592 A1 * | 7/2004 | Blumenschein et al. | 379/67.1 |
| 2004/0196964 A1 * | 10/2004 | Bluvband | 379/88.13 |
| 2004/0247097 A1 * | 12/2004 | Dillard et al. | 379/88.22 |
| 2005/0147227 A1 * | 7/2005 | Chervirala et al. | 379/215.01 |
| 2005/0261034 A1 * | 11/2005 | Punaganti et al. | 455/567 |
| 2006/0160530 A1 * | 7/2006 | Tipley | 455/418 |
| 2007/0041527 A1 * | 2/2007 | Tuchman et al. | 379/88.22 |
| 2007/0291108 A1 * | 12/2007 | Huber et al. | 348/14.02 |
| 2008/0019487 A1 * | 1/2008 | Crockett et al. | 379/88.2 |

(Continued)

*Primary Examiner* — Lisa Hashem

(57) ABSTRACT

When one party to an active call has momentarily stepped away from the call that has not been put on hold, the other party can record and leave a message for the party that stepped away, and then hang up. The call is monitored for return of the party that stepped away. When the returned party begins to speak, the message is immediately played to the returned party in response. In a conference, after a conferee who wishes to leave the conference, records a message and hangs up, the conference is monitored for either a break in the conversation or conversation directed to the party that left, and in response the message is played to the other conferees.

15 Claims, 3 Drawing Sheets

U.S. PATENT DOCUMENTS

| | | | |
|---|---|---|---|
| 2008/0260122 A1* | 10/2008 | Conway et al. | 379/112.01 |
| 2009/0010415 A1* | 1/2009 | Ustby | 379/215.01 |
| 2009/0175425 A1* | 7/2009 | Lee | 379/88.11 |
| 2009/0323908 A1* | 12/2009 | Gustafson | 379/88.14 |
| 2010/0166161 A1* | 7/2010 | Dhawan et al. | 379/88.19 |
| 2010/0211695 A1* | 8/2010 | Steinmetz et al. | 709/242 |
| 2010/0246783 A1* | 9/2010 | Rose et al. | 379/88.12 |
| 2011/0261933 A1* | 10/2011 | Moore et al. | 379/88.12 |

\* cited by examiner

LEAVING A MESSAGE FOR A PARTY WHILE ON AN ACTIVE REAL-TIME COMMUNICATION

TECHNICAL FIELD

This invention relates to real-time communications, such as telephone calls, and to messaging within the context of a real-time communication.

BACKGROUND OF THE INVENTION

It often happens during a real-time communication between parties, such as a telephone call, that one of the parties has to momentarily step away from the communication. The one party that is stepping away will likely leave the communication active and just set down their communication endpoint without putting the other party or parties on hold. The other party or parties may become impatient after a while, and may wish to leave a message for the one party that stepped away, and then hang up. But, without having been put on hold, the other party or parties are currently not provided with a mechanism by means of which they can leave a message for the one party.

U.S. Pat. Nos. 6,704,565 and 5,930,339 describe systems that allow a party that has been put on hold to leave a message for the hold-initiating party. These solutions do not enable a party who has not been put on hold to leave a message for the other party to the call.

A further disadvantage of these prior art systems is that the hold-initiating party must dial into a message system in order to retrieve the message. It would be desirable if the party could receive the message immediately upon returning to the present call.

Also, in a conference situation, one of the conferees may wish to drop off of the conference, but does not wish to interrupt the conference by announcing his or her intention to drop off. It would be desirable if a conferee could leave a message for receipt by the conferees immediately either upon a break in the conference conversation or upon the conversation being directed to him or her.

SUMMARY OF THE INVENTION

This invention is directed to solving these and other problems and disadvantages of the prior arts. According to one embodiment of the invention, one party to a presently-active communication between two (or more) parties—that is, a communication that has not been disconnected, transferred to a messaging system, put on hold, parked, or otherwise disconnected between the parties—can leave a message for the other party, and the other party receives the message as soon as presence on the communication of the other party is detected (illustratively, as soon as the other party returns to the call). The other party preferably receives the message automatically, and does not have to take any action, such as access any messaging system, establish a new connection, or press any keys, to receive the message.

According to another embodiment of this invention, a party to a conference can leave a message for the other conferees, and the conferees receive the message at a suitable time, such as either during a break in the conference conversation or when the conversation is directed to that party. Thus, the party preferably does not need to interrupt the conference to notify the other participants of his or her dropping off.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
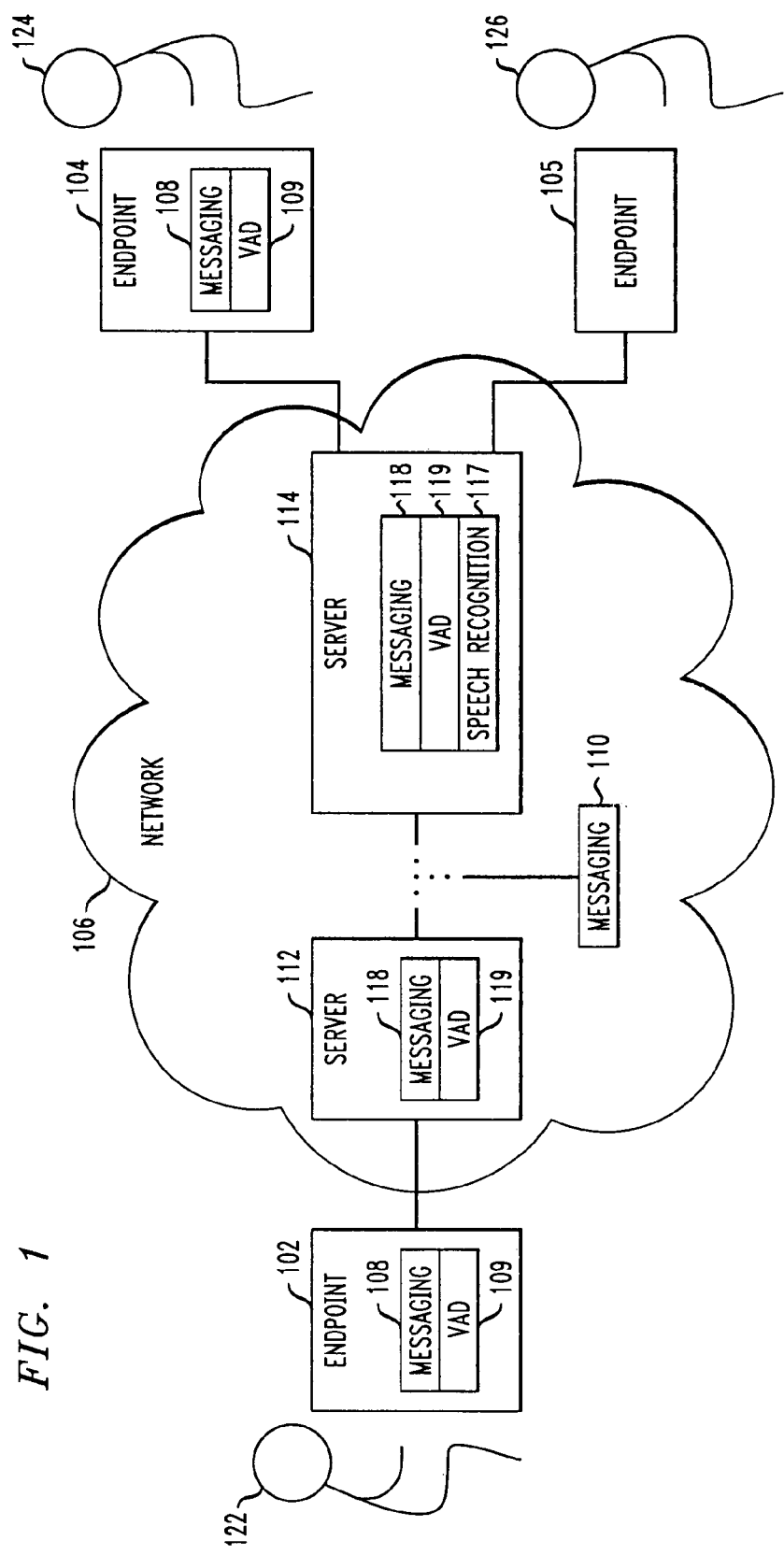
FIG. 1 is a block diagram of a communication system that includes an illustrative embodiment of the invention.

FIG. 1 shows an illustrative real-time communications system, illustratively a voice or a multimedia communication system. In its simplest form, the system includes two or more end-user communication devices, referred to as endpoints 102, 104 and 105, interconnected by a communications network 106. The communications system of FIG. 1 may be any desired type of system—analog or digital, circuit-switched or packet-switched, a hybrid of the above, etc. Depending upon the type of communications system, network 106 may include one or more servers 112-114—such as switches in the case of a circuit-switched system or routers in a packet-switched system, for example.

One or more of network 106 and endpoints 102 and 104 are equipped with messaging functionality 108, 110, 118. In the case of network 106, the messaging functionality may be implemented either in one or more servers 112 and 114, or as a separate messaging system 110. Messaging functionality 108, 110, 118 is illustratively voice messaging, although it can be any other desired form of messaging functionality, such as text messaging or multimedia messaging, for example. Messaging functionality 108, 110, 118, may be implemented in any desired form, such as hardware, firmware, software, or any combination thereof. The form and locus of the messaging functionality is substantially unimportant to the scope of the present invention.

One or more of network 106 and endpoints 102 and 104 are further equipped with presence-detection functionality—illustratively voice-activity detection (VAD) 109, 119—for detecting presence of a party on the communication. In one embodiment of the invention, the entity that is equipped with VAD 109, 119 is the same entity that is equipped with messaging functionality 108, 118. In another embodiment, the equipped entities are different.

Figure 3:
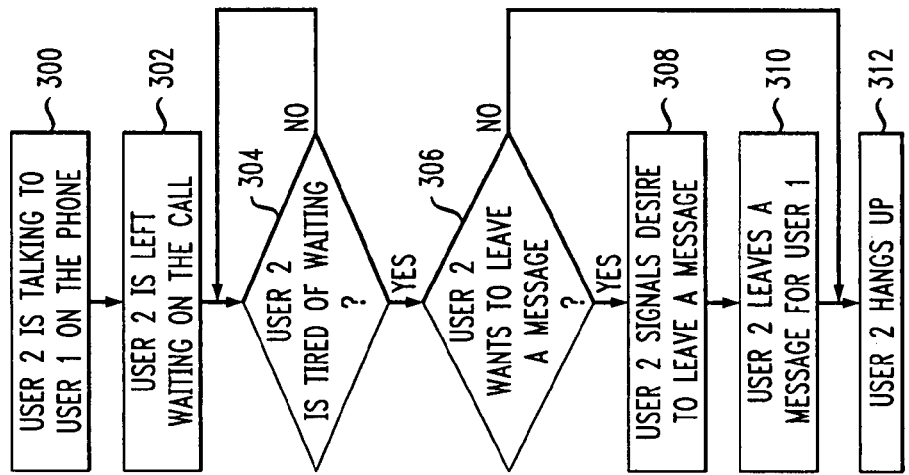
FIG. 3 is a functional flow diagram of actions of a second party to the communication in the system of FIG. 1.
Figure 2:
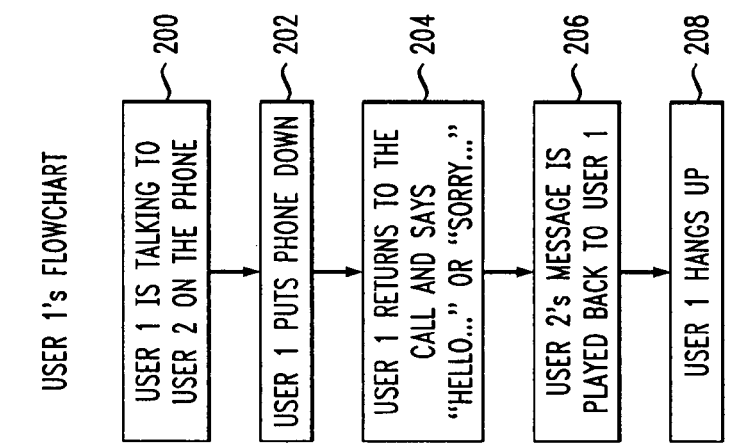
FIG. 2 is a functional flow diagram of actions of a first party to a communication in the system of FIG. 1.
Figure 4:
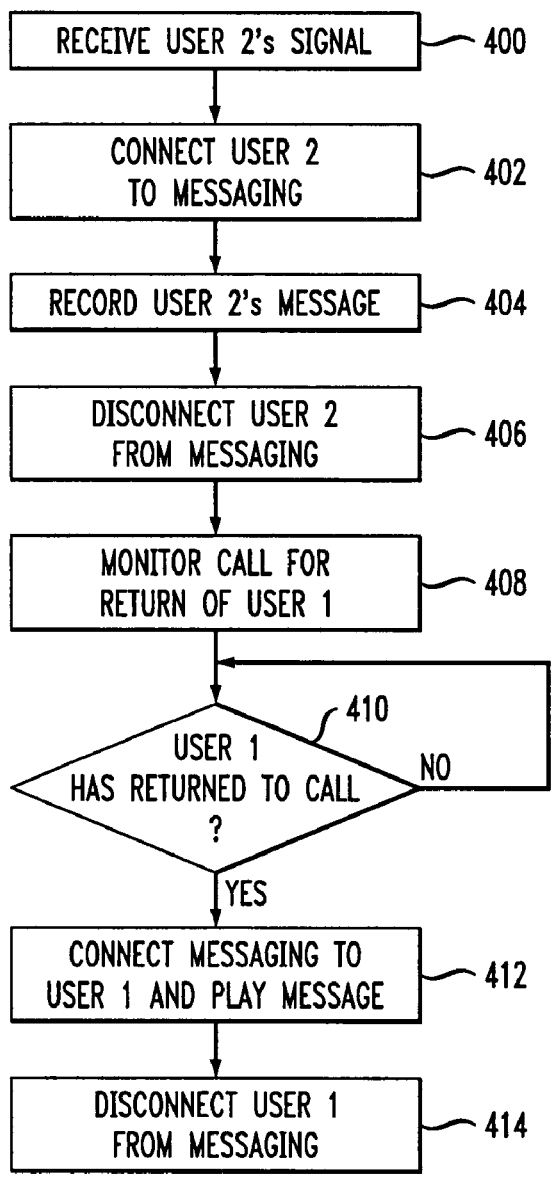
FIG. 4 is a functional flow diagram of operations of the system of FIG. 1 cooperative with the actions shown in FIGS. 2 and 3.

Functionality of the communications system of FIG. 1 according to an embodiment of the invention is shown in FIG. 4, while FIGS. 2 and 3 show the actions user1 122 and user2 124 of endpoints 102 and 104, respectively, that are involved in an illustrative example of the invention. Assume that user1 122 and user2 124 are engaged in an active real-time communication with each other through their endpoints 102 and 104, at steps 200 and 300 of FIGS. 2 and 3, respectively. Further assume that user1 122 temporarily stops communicating via endpoint 102, at step 202 of FIG. 2. For example, user1 122 leaves endpoint 102 to answer the door, or to look something up, etc.

Significantly, user1 122 maintains the communication in an active state. That is, he or she does not disconnect endpoint 102 from endpoint 104 by placing the communication on hold, parking the communication, transferring the communication to another endpoint or entity, etc., nor does he or she terminate the communication session of the communication.

Thus, the communication remains in an active state, and user2 124 of endpoint 104 is left waiting on the call, at step 302 of FIG. 3

Now suppose that user2 124 gets tired of waiting for user1 122 to return to the call, as determined at step 304, and instead of waiting further, he or she wants to leave a message for user1 122, as determined at step 306. Alternatively, an entity of the system of FIG. 1 detects absence of one party from the call, through a lack of communications traffic (e.g., silence) on the call, for a predetermined period of time, and in response prompts user2 124 to indicate his or her desire as to how to proceed. In either case, user2 124, signals his or her desire via endpoint 104, at step 308, such as by actuating a particular actuator on endpoint 104. This results in user2 124 being connected to messaging functionality 108, 110, or 118, at step 402 of FIG. 4. How this result is carried out depends on which messaging functionality is present. If messaging functionality 108 is present on endpoint 104, the signal is received internally in endpoint 104, at step 400 of FIG. 4, and endpoint 104 connects user2 124 via its user interface to messaging 108 in endpoint 104, at step 402. If messaging functionality 118 is present on near-end server 114, endpoint 104 sends the signaling to server 114. Server 114 receives the signal, at step 400, and in response connects endpoint 104 to messaging 118 at server 114. If messaging functionality 110 is present, endpoint 104 sends the signaling to server 114. Server 114 receives the signal, at step 400, and in response connects endpoint 104 to messaging functionality 110. If messaging functionality 118 is present in far-end server 112, endpoint 104 sends the user's signal to server 112 through server 114. Server 112 receives the signal, at step 400, and in response connects endpoint 104 to messaging 118 at server 112. If messaging functionality 108 is present on endpoint 102, endpoint 104 sends the user's signal to endpoint 102 through network 106. Endpoint 102 receives the signal, at step 400, and in response connects endpoint 104 to messaging 108 in endpoint 102.

Whichever messaging functionality 108, 110, 118 gets connected to endpoint 104 now prompts user2 124 to leave a message for user1 122, at step 310 of FIG. 3, and the connected messaging functionality records the message, at step 404 of FIG. 4. After leaving the message, user2 124 hangs up or otherwise terminates the communication, at step 312 of FIG. 3, and consequently user2 124 gets disconnected from the messaging functionality, at step 406 of FIG. 4.

The presence-detection functionality—in this example VAD 109 or 119 of whichever entity 102, 104, 112, 114 connected user2 124 to the messaging functionality—now begins to monitor the communication for return of user1 122 to the communication, at step 408. When user1 122 returns and resumes his or her participation in the communication—by saying "hello" or "sorry . . . ", for example—at step 204 of FIG. 2, the monitoring VAD 109 or 119 detects and signals the return of user1 122, at step 410 of FIG. 4. In response to the signaling, the entity 102, 104, 112, 114 that is associated with detecting VAD 109 or 119 connects the messaging that recorded the message to endpoint 102 and causes the messaging to play the message to user1 122, at step 412. User1 122 receives the message, at step 206 of FIG. 2. The same entity 102, 104, 112, 114 then disconnects the messaging from endpoint 102, at step 414, and user1 122 hangs up or otherwise terminates the communication, at step 208 of FIG. 2. The messaging entity 108 or 118 can provide user1 122 with other standard features like save message, delete message, etc.

In an alternative embodiment, one or more additional endpoints 105 (see FIG. 1) may be involved in the communication, which is now a conference. The conference is conventional and conventionally implemented. For example, a server 114 of network 106 implements the conference, where server 114 may illustratively be a private branch exchange (PBX) or a central conference bridge server. In addition to VAD 119, server 114 is equipped with speech-recognition functionality 117. A participant 102-105 in the conference leaves a message for the other conference participants in the manner described above, and then drops out of the conference. VAD 119 and speech-recognition functionality 117 then monitor the conference for a suitable moment at which to play the message out to the other conference participants. VAD 119 monitors the conference for a pause in the conversation, i.e., a lack of voice activity, while speech-recognition functionality 117 monitors the conference for any conversation directed to the participant who dropped off, e.g., for occurrence of the dropped-off participant's name in the conversation. When the monitored-for activity occurs, server 114 causes messaging functionality 118 or 110 to play out the dropped-off participant's message to the other participants.

The term "call" as used herein is intended to be construed broadly so as to encompass traditional telephony, internet telephony communications, VoIP communications, Session Initiation Protocol (SIP) communications, multimedia communications, or other types of network traffic in a network-based communication system.

Of course, various changes and modifications to the illustrative embodiments described above will be apparent to those skilled in the art. For example, any user of a real-time may be permitted to leave a message at any time, even when the user is not kept waiting. This may be desirable due to the fact that one party does not think that the other party is listening to him/her or just does not feel like continuing the conversation and just wants to leave a message for the other party and drop off. Or, a party may wish to leave a message that will be played when there's a pause in the conference call conversation, but the party intends to return to the call. For example, the message might be "My boss is calling, I'll be back in a minute." In this case, the party will not drop off, and will merely set the phone down or put the call on hold. If the party rejoins the call when the message has not yet been played, the party will desire to have the message canceled, preferably automatically. The automatic cue to cancel the message might be the party's taking the call off hold or rejoining the conversation. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   in a hardware based messaging server performing the following steps:
   in a real-time communication that is not on hold and is connected by a communication system between a first party and at least one second party, detecting absence of the second party from the communication for a predetermined period of time;
   in response to the absence, prompting the first party to signal a desire to leave a message for the second party;
   in response to receiving a signal from the first party, storing a message from the first party;
   monitoring the communication for presence of the second party; and in response to detecting the presence of the second party on the communication, sending the stored message to the second party.

2. The method of claim 1 wherein:
the communication comprises one of a voice call and a multimedia communication.

3. The method of claim 1 wherein:
the communication comprises a voice call;
storing includes
   in response to signaling by the first party on the voice call, connecting the first party to a voice messaging entity, and the voice messaging entity recording a voice message from the first party;
monitoring comprises
   monitoring the call for presence of voice; and
sending comprises
   causing the voice messaging entity to play the recorded voice message to the second party.

4. The method of claim 3 wherein:
monitoring the call for presence of voice comprises
   in response to the first party hanging up on the call, monitoring the call for presence of voice.

5. The method of claim 1 wherein:
the monitoring comprises
   in response to the first party leaving the communication, monitoring the communication for presence of the second party.

6. An apparatus comprising:
in a real-time communication that is not on hold and is connected by a communication system between a first party and at least one second party, hardware based means for detecting absence of the second party from the communication for a predetermined period of time;
hardware based means for prompting the first party to signal a desire to leave a message for the second party in response to the absence;
hardware based means for storing a message from the first party;
hardware based means for monitoring the communication for presence of the second party; and
hardware based means for sending the stored message to the second party in response to detecting the presence of the second party on the communication.

7. The apparatus of claim 6 wherein:
the means for storing, the means for monitoring, and the means for sending comprise a communication endpoint of at least one of the first and the second parties.

8. The apparatus of claim 6 wherein:
the means for storing, the means for monitoring, and the means for sending comprise at least one server of the communication system connecting the first party with the second party.

9. The apparatus of claim 8 wherein:
the means for storing comprise a messaging entity.

10. The apparatus of claim 6 wherein:
the communication comprises a voice call; and
the means for monitoring comprise a voice-activity detector for detecting presence of voice on the call.

11. The apparatus of claim 6 wherein:
the means for storing comprise
   a messaging entity, and
   means for detecting the signaling and in response connecting the first party to the messaging entity.

12. The apparatus of claim 6 wherein:
the communication comprises one of a voice call and a multimedia communication.

13. The apparatus of claim 6 wherein:
the communication comprises a voice call;
the means for storing comprise
   a voice-messaging entity for recording a voice message from the first party, and means for detecting the signaling and in response connecting the first
party to the voice-messaging entity;
the means for monitoring comprise
   a voice-activity detector for detecting presence of voice on the call; and
the means for sending comprise
   means for connecting the voice-messaging entity to the second party and causing the voice-messaging entity to play the recorded voice message.

14. The apparatus of claim 13 wherein:
the means for monitoring further comprise
   means for detecting that the first party has hung up on the call, and in response activating the voice-activity detector.

15. The apparatus of claim 6 further comprising:
means for detecting that the first party has left the communication, and in response activating the monitoring means.

* * * * *